US005104549A

United States Patent [19]

Kamei et al.

[11] Patent Number: 5,104,549

[45] Date of Patent: Apr. 14, 1992

[54] WASTE TREATMENT PROCESS FOR ALKALINE WASTE LIQUID

[75] Inventors: Yoshinobu Kamei; Wataru Shirato, both of Ibaraki, Japan

[73] Assignee: Mitsubishi Nuclear Fuel Co., Tokyo, Japan

[21] Appl. No.: 686,489

[22] Filed: Apr. 17, 1991

[30] Foreign Application Priority Data

Apr. 25, 1990 [JP] Japan .................................. 2-109487

[51] Int. Cl.[5] ............................ C02F 1/28; C02F 1/54

[52] U.S. Cl. .................................... 210/682; 210/705; 210/730; 423/6; 423/11; 423/12

[58] Field of Search ............... 210/705, 730, 729, 682; 423/6, 11, 12

[56] References Cited

U.S. PATENT DOCUMENTS 2,133,251 10/1938 McCord .............................. 210/729
3,374,081 3/1968 Miller .................................. 210/730
3,725,291 4/1973 Serbus et al. ........................... 423/6
4,089,779 5/1978 Neal .................................... 210/695
4,110,208 8/1978 Neal .................................... 210/730
4,180,545 12/1979 McCullough et al. ............... 423/11
4,263,148 4/1981 Symens et al. ........................ 210/705
4,558,080 12/1985 Quamme et al. ..................... 210/723
4,781,839 11/1988 Kelly et al. ........................... 210/728
4,871,518 10/1989 Yoon et al. ............................ 423/1

FOREIGN PATENT DOCUMENTS 32-4703 12/1957 Japan .

*Primary Examiner*—Stanley S. Silverman
*Assistant Examiner*—Cynthia L. Nessler
*Attorney, Agent, or Firm*—Oblon, Spivak, McClelland, Maier & Neustadt

[57] ABSTRACT

There is disclosed a waste treatment process for alkaline waste liquid in which substances to be removed exist in ionic and colloidal states. In the process, powdered tannin is added to the waste liquid to produce solid substance of the tannin and to capture the substances to be removed on the solid substance. Then, the waste liquid is subjected to filtration to thereby separate the solid substance including the substances to be removed.

2 Claims, No Drawings

WASTE TREATMENT PROCESS FOR ALKALINE WASTE LIQUID

BACKGROUND OF THE INVENTION

1. Field of the Invention

The present invention relates to a process for treating alkaline waste liquid which contains ionic and/or colloidal substances.

2. Related Art

Nuclear fuels such as uranium or thorium remain in the waste liquid drained during the processing of nuclear fuels. Methods using adsorbent such as gelled persimmon tannin, chelating resin, or hydrated titanium oxide are hitherto known as the waste treatment processes for the waste liquids of this kind, With such waste liquids, however, uranium and thorium may exist not only in the ionic state but also in the form of minute colloidal substances. The ionic substances can be adsorbed and removed by the aforesaid conventional methods, but the colloidal substances cannot be successfully removed.

The applicant of this application has previously developed a novel waste treatment process using tannin, which was disclosed in Japanese Patent Application No. 2-2051. This copending application, which is not published yet, describes a process comprising the steps of dissolving a tannin in a solution containing material to be removed, adding an aldehyde to the solution and further adding ammonia to the solution to produce a precipitate having the tannin as a principal constituent and capturing the material to be removed on the precipitate. This treatment process is applicable to the treatment of the waste liquids in which uranium and thorium exist even in colloidal state. However, the process is rather complicated, for which reason improvement has been desired.

SUMMARY OF THE INVENTION

It is therefore the object of the present invention to provide a waste treatment process for alkaline waste liquid, which is simple in operation and can effectively remove not only the ionic substances but also the colloidal substances from the waste liquid.

According to the present invention, there is provided a waste treatment process of alkaline waste liquid in which substances to be removed exist in ionic and colloidal states, comprising the steps of:

adding powdered tannin to the waste liquid to produce solid substance essentially consisting of the tannin and to capture the substances to be removed on the solid substance; and subsequently subjecting the waste liquid to filtration to thereby separate the solid substance including the substances to be removed.

DETAILED DESCRIPTION OF THE INVENTION

Some waste liquids drained in the manufacture of nuclear fuels are alkaline. For example, the waste liquid drained from the uranium conversion process contains $NH_4F$ in addition to the nuclear fuels such as uranium or thorium and has a pH of around 10. In this alkaline waste liquid, uranium and thorium exist not only in ionic states but also in minute colloidal states.

The process in accordance with the present invention is particularly developed to treat the aforesaid alkaline waste liquid, and is characterized in that powder tannin is added to the waste liquid to produce solid substance substantially consisting of the tannin and to capture the substances to be removed on the solid substance; and that the waste liquid is then subjected to filtration to thereby separate the solid substance including the substances to be removed.

More specifically, powdered tannin is first added to the waste liquid as it is. As the kind of tannin to be selected, a condensed tannin, such as quebracho tannin, wattle tannin, mangrove tannin, spruce tannin, gambier tannin, acacatechin, and oak bark tannin, is preferable. This is because the precipitation occurs more thoroughly compared with other types of tannin such as hydrolyzable tannin.

Then, the waste liquid is sufficiently agitated, so that the powdered tannin and the waste liquid are mixed in contact with one another. As a result, some of the tannin dissolves and some remains undissolved, and solid flocculent precipitates substantially consisting of tannin are formed. The uranium and thorium in the waste liquid are captured on these precipitates. In the foregoing, it is preferable that the agitating time is set to no less than 20 minutes but not excessively long. The most preferable agitation time is from 25 to 35 minutes.

Subsequently, the waste liquid is subjected to a conventional filtering method, to thereby separate the solid substances from the waste liquid. Thus, the uranium and thorium contained in the waste liquid are separated and recovered. In this process, it is submitted that the ionic substances can be caught on the solid precipitates by means of adsorption, while the colloidal substances are subjected to coagulating sedimentation (coprecipitation) when the tannin dissolved in the waste liquid due to the agitation precipitates in the alkaline atmosphere.

According to the process of the invention, the tannin in the form of powder can be used as it is, so that it is not necessary to manufacture any adsorbent in advance. Therefore, the process is simple in operation and very economical. In addition, since the ionic and colloidal substances can be removed at the same time, the process is very convenient and effective.

The present invention will now be described concretely by way of the following examples.

EXAMPLE 1

250 ml of waste liquid of pH 10, which contained $6.90\times10^{0}$Bq/cm$^3$ of $\alpha$ nuclide (U), $4.16\times10^{0}$Bq/cm$^3$ of $\beta$ nuclide (Th), 44.0 g/l of $NH_3$ and 27.7 g/l of F, was prepared. Thereafter, 100 mg of tannin powder of condensed type was added to the waste liquid, which was then subjected to agitation for a period of 35 minutes and was filtered by a conventional method. In the resulting filtrate, $\alpha$ nuclide (U) was reduced to a concentration of $2.57\times10^{-1}$Bq/cm$^3$ and its recovery was 96.3%, while $\beta$ nuclide (Th) was reduced to a concentration of $4.62\times10^{-2}$Bq/cm$^3$ and its recovery was 88.9%.

EXAMPLE 2

A waste liquid, which was similar to that in Example 1 but contained $6.40\times10^{0}$Bq/cm$^3$ of $\alpha$ nuclide (U) and $2.26\times10^{0}$Bq/cm$^3$ of $\beta$ nuclide (Th), was prepared. Then, the same amount of condensed tannin powder as in Example 1 was added, and the waste liquid was subjected to agitation for 30 minutes and further to the filtration. Thus, in the resulting filtrate, $\alpha$ nuclide (U) was reduced to a concentration of $3.70\times10^{-2}$Bq/cm$^3$ and its recovery was 99.4%, while β nuclide (Th) was reduced to a concentration of $3.30\times10^{-2}$Bq/cm$^3$ and its recovery was 85.4%.

COMPARATIVE EXAMPLE

Instead of the condensed tannin powder, an insoluble tannin adsorbent was used, and the same procedures as in Example 1 were repeated. In this case, 40.4 to 63.5% of the uranium and thorium were recovered.

As will be clearly understood from the above experimental results, the use of powder tannin is very effective to reduce the α nuclide (U) and the β nuclide (Th) from the waste liquid. This is because not only the α and β nuclides in the ionic state but also those in colloidal state were removed from the waste liquid in Examples 1 and 2, while only the nuclides in the ionic state were removed in Comparative Example.

As described above, in the process of the invention, the uranium and thorium can be removed very efficiently even though they exist in the waste liquid in minute colloidal form. Therefore, the process is very effective and of great practical value.

Furthermore, inasmuch as the tannin to be used is powdered, it is not necessary to manufacture insoluble tannin in advance. Therefore, the process is simple in operation and very economical.

Moreover, the tannin precipitates remaining after the waste treatment can be reduced in volume by means of incineration, so that the emission of solid wastes can be reduced. Furthermore, the incineration products may be of pure uranium oxide, which can therefore be used again.

Obviously many modifications and variations of the present invention are possible in the light of the above. It is therefore to be understood that within the scope of the appended claims, the invention may be practiced otherwise than as specifically described.

What is claimed is:

1. A waste treatment process for alkaline waste liquid containing $NH_3$ and F in which nuclear fuel materials including uranium and thorium exist in ionic and colloidal states, comprising the steps of:

adding powdered condensed tannin to the waste liquid, wherein the condensed tannin remains at least partially undissolved to produce a solid substance essentially consisting of the tannin and to capture said nuclear fuel materials including uranium and thorium on said solid substance; and subsequently subjecting said waste liquid to filtration to thereby separate said solid substance including said nuclear fuel materials including uranium and thorium.

2. A process according to claim 1, wherein said condensed tannin is selected from the group consisting of quebracho tannin, wattle tannin, mangrove tannin, spruce tannin, gambler tannin, acacatechin, and oak bark tannin.

* * * * *